(12) United States Patent
Yano

(10) Patent No.: US 8,467,673 B2
(45) Date of Patent: Jun. 18, 2013

(54) IMAGING APPARATUS, CAMERA SYSTEM, AND ILLUMINATION APPARATUS

(75) Inventor: Shinichiro Yano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 13/240,880

(22) Filed: Sep. 22, 2011

(65) Prior Publication Data

US 2012/0076483 A1   Mar. 29, 2012

(30) Foreign Application Priority Data

Sep. 29, 2010  (JP) .................................. 2010-219487

(51) Int. Cl.
*G03B 9/70*   (2006.01)

(52) U.S. Cl.
USPC .......................................... 396/166; 396/224

(58) Field of Classification Search
USPC .................... 396/161, 166–170, 224
See application file for complete search history.

(56) References Cited

U.S. PATENT DOCUMENTS

| 4,653,893 | A | * | 3/1987 | Inoue et al. | 396/167 |
| 4,721,976 | A | * | 1/1988 | Aihara et al. | 396/234 |
| 4,908,651 | A | * | 3/1990 | Fujino et al. | 396/48 |
| 4,974,005 | A | * | 11/1990 | Izumi et al. | 396/130 |
| 5,396,310 | A | * | 3/1995 | Fujiyama | 396/168 |
| 2012/0076483 | A1 | * | 3/2012 | Yano | 396/161 |

FOREIGN PATENT DOCUMENTS

JP   11-271850 A   10/1999

* cited by examiner

*Primary Examiner* — W B Perkey

(74) *Attorney, Agent, or Firm* — Canon USA Inc. IP Division

(57) ABSTRACT

An imaging apparatus capable of imaging using an illumination apparatus includes an acquisition unit configured to acquire object luminance information, a calculation unit configured to calculate an exposure control value based on the object luminance information acquired by the acquisition unit, an exposure control unit configured to control exposure using the exposure control value calculated by the calculation unit, and an exposure fixing unit configured to set an exposure fixed state in which the exposure control value calculated by the calculation unit is fixed as the exposure control value to be used for exposure control, wherein the exposure fixing unit is configured to cancel the exposure fixed state when a state of the illumination apparatus is changed in the exposure fixed state.

7 Claims, 7 Drawing Sheets

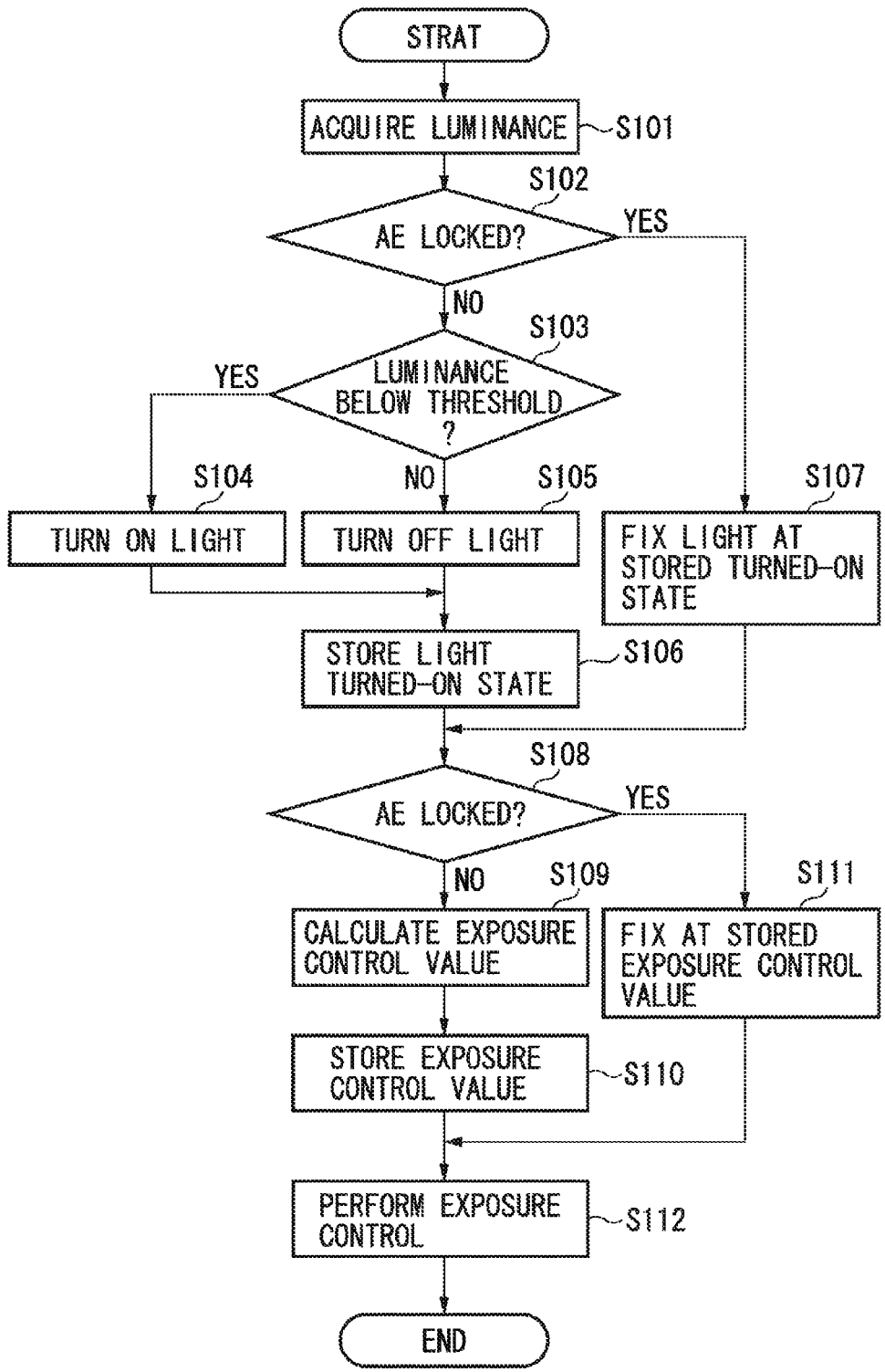

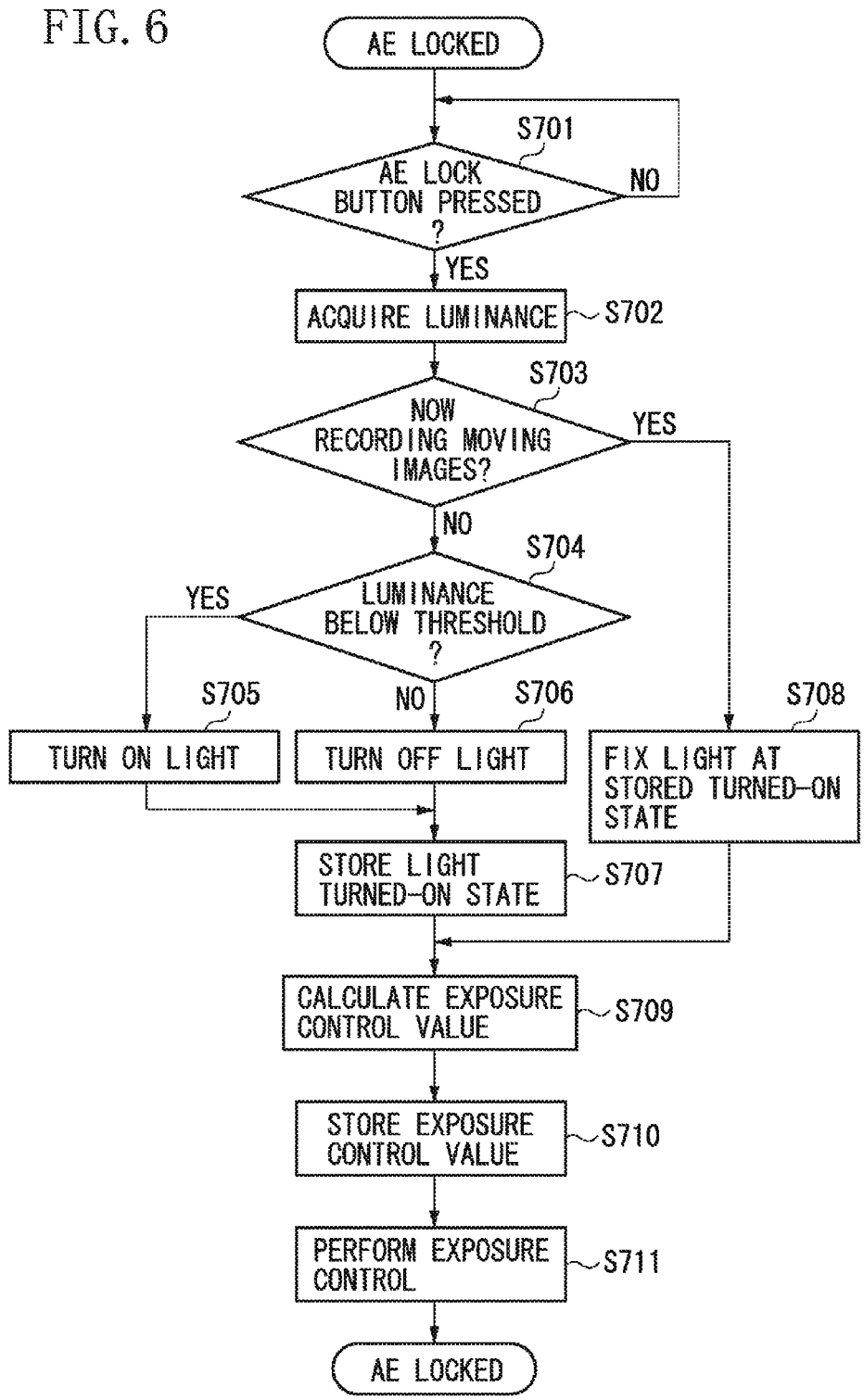

IMAGING APPARATUS, CAMERA SYSTEM, AND ILLUMINATION APPARATUS

BACKGROUND OF THE INVENTION

1. Field of the Invention

The present invention relates to a camera system that includes an imaging apparatus and an illumination apparatus.

2. Description of the Related Art

Conventionally, in an imaging apparatus capable of recording moving images, such as a video camera, when an object is dark, imaging can be performed with a video light turned on to act as auxiliary light. For example, Japanese Patent Application Laid-Open No. 11-271850 discusses a video camera system in which a video light is attached to a video camera, wherein the video camera outputs light control information and the video light performs light control based on the light control information. Further, Japanese Patent Application Laid-Open No. 11-271850 discusses suitably setting the exposure during imaging by calculating the exposure of the object to be imaged by the video camera and controlling the amount of light emitted from the video light based on the calculation result.

However, in the technique discussed in Japanese Patent Application Laid-Open No. 11-271850, if imaging is performed using an auto-exposure (AE) lock function, in which the exposure control value used for exposure control is fixed, it may be impossible to perform imaging as intended by the photographer.

Consider, for example, a case in which an AE lock button is pressed in a state in which an object A is in the center of an image plane as illustrated in FIG. 7A. When the AE lock button is pressed, the weighting given to the object luminance near the center of the image plane is increased so that the exposure for the object in the center of the image plane is appropriate. Consequently, since the weighting given to the luminance of the relatively bright object A in FIG. 7A is increased, it is determined that the video light does not need to be turned on. Further, an exposure control value is calculated so that the exposure of the object in the center of the image plane is appropriate, and while the AE is locked the exposure is fixed at the calculated exposure control value.

Subsequently, if the framing is changed so that a background that is darker than the object A is in the center of the image plane, the weighting given to the dark background is increased. Therefore, it is determined that the video light needs to be turned on, and thus the video light is turned on. However, at this stage the exposure control value is fixed by the AE lock, and thus is the same as that illustrated in FIG. 7A. Consequently, by changing the video light from off to on as illustrated in FIG. 7B without changing the exposure control value, the whole of the image plane becomes brighter, which causes the object A, which had an appropriate exposure when the AE was locked, to become overexposed.

Similarly for the opposite case, when the AE was locked, if the video light is on, and it is determined that the video light does not need to be on due to a change in the framing, the object A, which had an appropriate exposure when the AE was locked, becomes underexposed.

Thus, if the video light is controlled to be turned on and off based on the luminance of an object, when imaging is performed using an AE lock function, it may be impossible to perform imaging as intended by the photographer.

SUMMARY OF THE INVENTION

According to an aspect of the present invention, an imaging apparatus capable of imaging using an illumination apparatus includes an acquisition unit configured to acquire object luminance information, a calculation unit configured to calculate an exposure control value based on the object luminance information acquired by the acquisition unit, an exposure control unit configured to control exposure using the exposure control value calculated by the calculation unit, and an exposure fixing unit configured to set an exposure fixed state in which the exposure control value calculated by the calculation unit is fixed as the exposure control value to be used for exposure control, wherein the exposure fixing unit is configured to cancel the exposure fixed state when a state of the illumination apparatus is changed in the exposure fixed state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating exposure control processing according to a first exemplary embodiment of the present invention.

FIG. 6 is a flowchart illustrating exposure control processing according to a second exemplary embodiment of the present invention.

DESCRIPTION OF THE EMBODIMENTS

Various exemplary embodiments, features, and aspects of the invention will be described in detail below with reference to the drawings.

Figure 1:
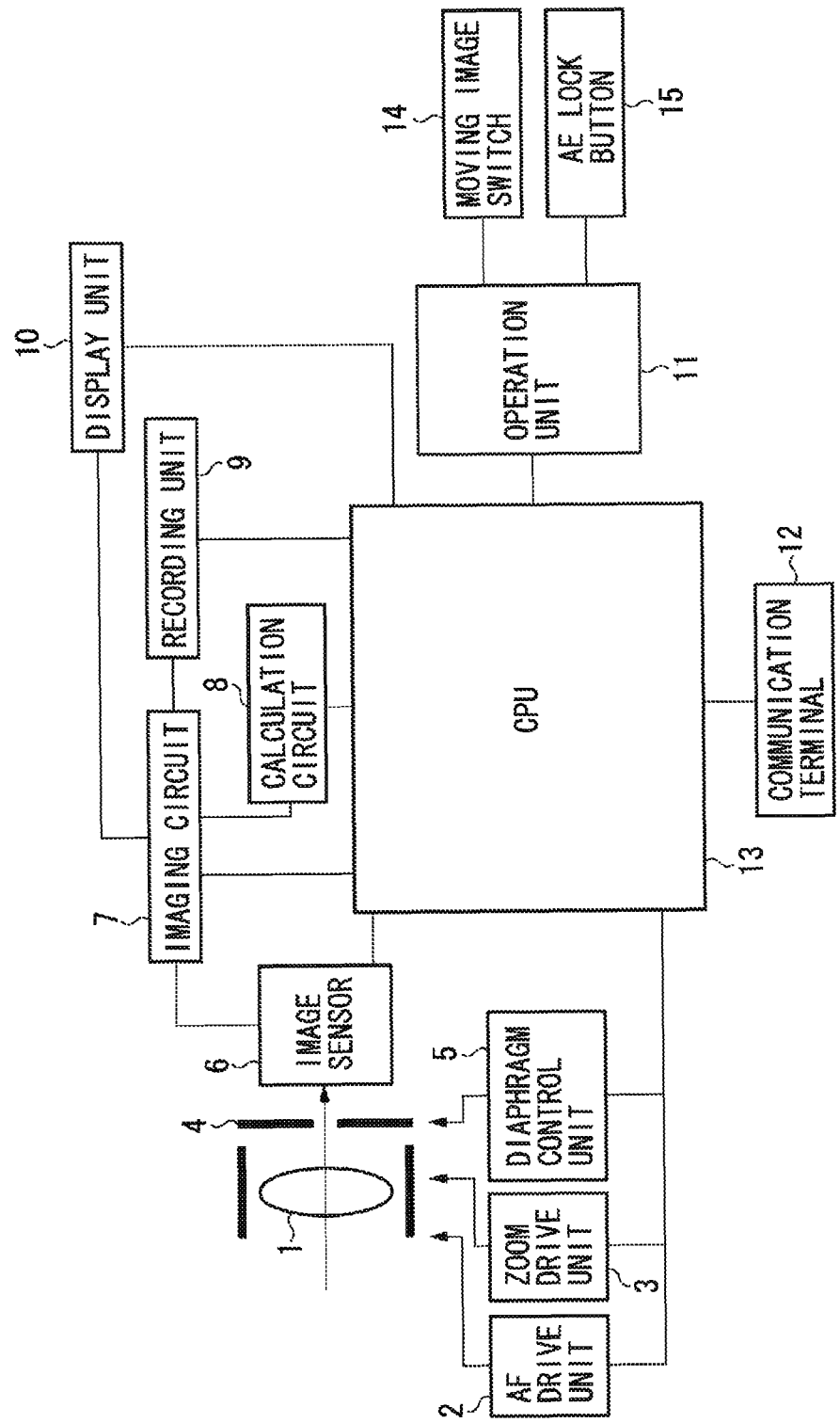
FIG. 1 is a block diagram illustrating a configuration of a camera according to an exemplary embodiment of the present invention.

FIG. 1 is a block diagram illustrating a configuration of a camera, which is an imaging apparatus, according to an exemplary embodiment of the present invention. In FIG. 1, an autofocus (AF) drive unit 2 performs automatic focus control by driving a photographic lens 1. The AF drive unit 2 is configured from a direct current (DC) motor or a stepping motor. The AF drive unit 2 brings a desired region in an image plane into focus by changing a focus lens position of the photographic lens 1 based on control by a central processing unit (CPU) 13.

A zoom drive unit 3 performs focal length control by driving the photographic lens 1. The zoom drive unit 3 is configured from, for example, a DC motor or a stepping motor. The zoom drive unit 3 changes the focal length of the photographic lens 1 by changing the zoom lens position of the photographic lens 1 based on control by the CPU 13.

A diaphragm 4 adjusts the amount of light incident on a below-described image sensor 6. A diaphragm control unit 5 changes the aperture value by driving the diaphragm 4 based on a diaphragm drive amount calculated by the CPU 13.

The image sensor 6 forms an object image from the light that has passed through the photographic lens 1, and photoelectrically converts the formed object image. An imaging circuit 7 converts the electric signal obtained from the image sensor 6 into data suitable for a below-described recording unit 9 and a calculation circuit 8 as image data, and outputs the converted data. The amount of accumulated electric charge can be adjusted by the CPU 13 controlling the charge accumulation time in the image sensor 6. Further, the imaging sensitivity can be adjusted by the CPU 13 controlling, for example, the gain of the image sensor 6 and the imaging circuit 7. The calculation circuit 8 acquires, for example, focusing state information and luminance information of the object based on the image data output from the imaging circuit 7. The recording unit 9 records the image data output from the imaging circuit 7. A display unit 10 displays an image based on the image data output from the imaging circuit 7.

In addition to the above control, the CPU 13 performs automatic exposure control based on an exposure control value, such as the aperture value, the charge accumulation time, and the imaging sensitivity, calculated based on a weighted luminance value calculated by weighting the object luminance value based on the object luminance information. The CPU 13 also performs light control of a below-described photographic light based on the weighted object luminance value. Further, based on an output from a below-described operation unit 11, the CPU 13 also determines whether the imaging apparatus is currently recording moving images and whether the AE is locked.

The operation unit 11 includes, for example, a moving image switch 14 for instructing moving image recording to start and finish, and an AE lock button 15 for setting an AE locked state. When the AE lock button 15 is pressed, the CPU 13 stores the exposure control value calculated based on the object luminance information at that time, and sets an exposure fixed state (hereinafter, sometimes referred to as "AE locked state"), in which that value is fixed as the exposure control value. If an imaging instruction is made in the AE locked state, the imaging is performed using the fixed exposure control value. Further, in the present exemplary embodiment, when the AE lock button 15 is again pressed while the imaging apparatus is in the AE locked state, the exposure control value calculated based on the object luminance information just prior to the AE lock button 15 being pressed is newly stored, and the imaging apparatus is fixed with this value as the exposure control value. More specifically, the fixed exposure control value is reset each time the AE lock button 15 is pressed. As described below, resetting of the fixed exposure control value and of the state (turned-on state or turned-off state) of the photographic light is also referred to as updating of the fixed exposure control value and of the state of the photographic light.

A communication terminal 12 is used for communicating with the connected photographic light. Information about light control output from the CPU 13 is transmitted via the communication terminal 12 to the photographic light. In addition, information about the turned-on state of a below-described light 16 output from the photographic light is also transmitted to the camera via the communication terminal 12.

Figure 2:
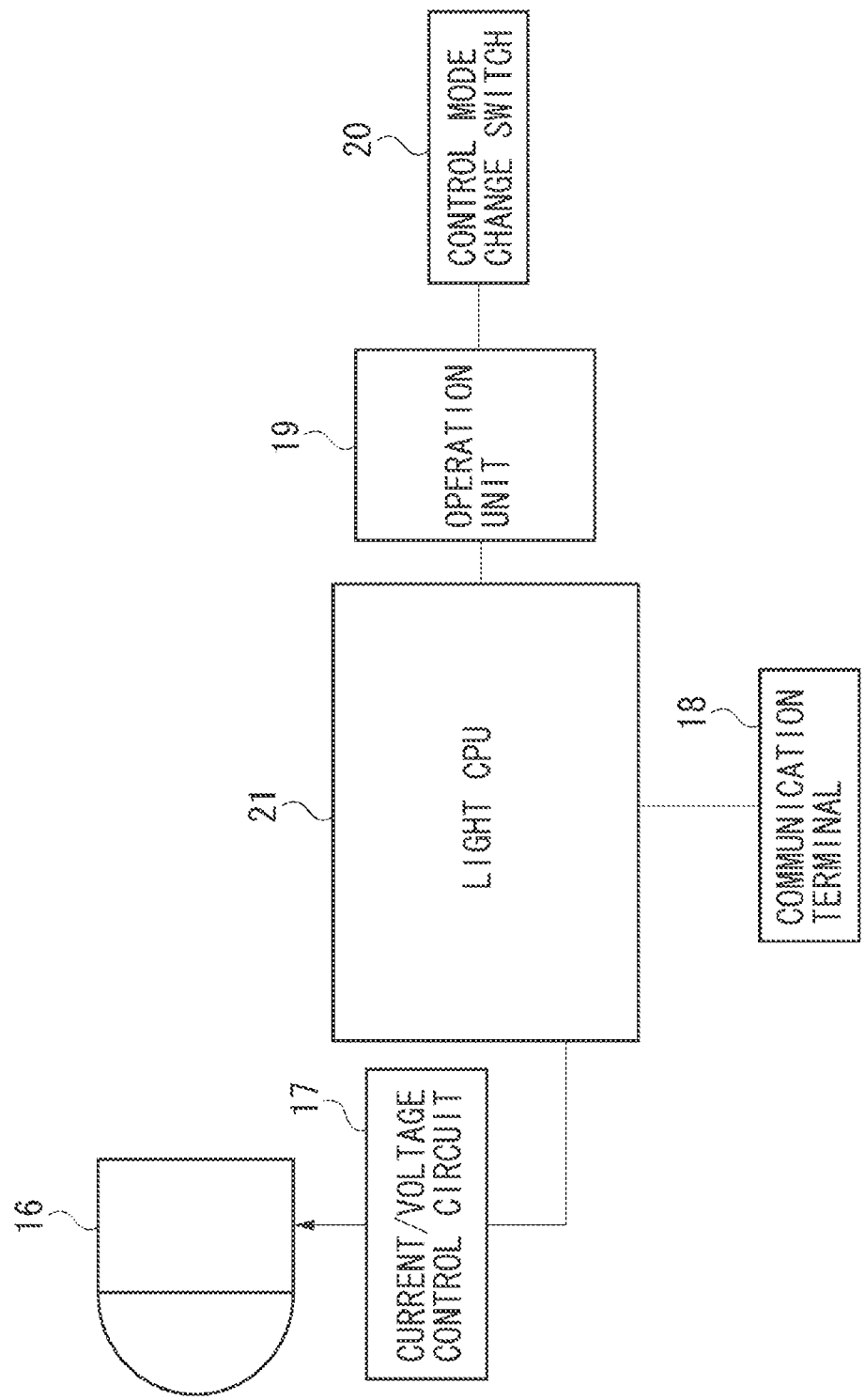
FIG. 2 is a block diagram illustrating a configuration of a photographic light according to an exemplary embodiment of the present invention.

FIG. 2 is a block diagram illustrating a configuration of a photographic light, which is an illumination apparatus connected to the camera.

The light 16 is a light source such as a light-emitting diode (LED). A current/voltage control circuit 17 controls the current and the voltage supplied to the light 16. The current/voltage control circuit 17 also switches the light 16 on and off based on a signal from a CPU 21. A communication terminal 18 is used for communicating with the camera.

An operation unit 19 includes a control mode change switch 20 for setting the control mode of the photographic light. The CPU 21 (hereinafter, referred to as the "light CPU 21") controls the light 16 based on the control mode set using the control mode change switch 20. The photographic light in the present exemplary embodiment can be set to three control modes by the control mode change switch 20. The first mode is an automatic control mode, in which light control of the light 16 is performed based on an instruction from the connected camera. The second mode is an "always on mode", in which the light 16 is always on. The third mode is an "always off mode", in which the light 16 is always off.

Next, the exposure control processing performed in the present exemplary embodiment will be described with reference to FIG. 3, which illustrates a case in which the photographic light control mode is set to the automatic control mode. This exposure control processing is executed at a predetermined period with the camera power source in an ON state, and is thus executed even if the photographer does not perform a specific operation.

First, in step S101, the calculation circuit 8 acquires the object luminance information based on the image data output from the imaging circuit 7. Next, in step S102, the CPU 13 determines whether the AE is locked based on an output from the operation unit 11. If it is determined that the AE is not locked (NO in step S102), the processing proceeds to step S103. If it is determined that the AE is locked (YES in step S102), the processing proceeds to step S107.

If the AE is not locked, then in step S103, the CPU 13 determines whether to turn on the light 16 based on the object luminance information acquired in step S101. This determination is performed based on whether the object luminance value based on the object luminance information acquired in step S101 and then weighted using a predetermined weighting is less than a predetermined threshold. If the calculated weighted object luminance value is less than the predetermined threshold (YES in step S103), the CPU 13 determines that the light 16 is to be turned on. If the calculated weighted object luminance value is equal to or greater than the predetermined threshold (NO in step S103), the CPU 13 determines that the light 16 is to be turned off.

If it is determined to turn on the light 16 (YES in step S103), the processing proceeds to step S104. In step S104, the CPU 13 issues an instruction to the light CPU 21 via the communication terminal 12 to turn on the light 16. Based on the instruction from the CPU 13, the light CPU 21 turns on the light 16. If the light 16 is already on, step S104 may be skipped. Further, in the present exemplary embodiment, although the light emission intensity of the light 16 when it is turned on is fixed, the light emission intensity of the light 16 may be varied based on the object luminance information. In this case, in step S104, the CPU 13 also outputs to the photographic light information about the light emission intensity of the light 16 that is calculated based on the object luminance information. Then, if the light 16 is already turned on, the light CPU 21 varies the light emission intensity of the light 16 based on the information about the light emission intensity output from the CPU 13.

On the other hand, if it is determined to turn off the light 16 (NO in step S103), the processing proceeds to step S105. In step S105, the CPU 13 issues an instruction to the light CPU 21 via the communication terminal 12 to turn off the light 16. Based on the instruction from the CPU 13, the light CPU 21 turns off the light 16. If the light 16 is already off, step S105 may be skipped.

Next, in step S106, the CPU 13 stores information about the state (turned-on state or turned-off state) of the light 16 transmitted from the photographic light in a memory (not-illustrated).

If it is determined in step S102 that the AE is locked (YES in step S102), then in step S107, the CPU 13 fixes the state of the light 16 to the state stored in a memory (not-illustrated) without controlling the state of the light 16 based on the object luminance information acquired in step S101.

Consequently, the state of the light 16 does not change from the state when the AE lock button 15 has been pressed even if the framing changes after the AE lock button 15 is pressed.

Next, in step S108, the CPU 13 again determines whether the AE is locked based on an output from the operation unit 11. If it is determined that the AE is not locked (NO in step S108), the processing proceeds to step S109. If it is determined that the AE is locked (YES in step S108), the processing proceeds to step S111.

In step S109, the CPU 13 calculates an exposure control value based on the object luminance information acquired in step S101. Then, in step S110, the CPU 13 stores the exposure control value calculated in step S109 in a memory (not-illustrated).

If it is determined in step S108 that the AE is locked (YES in step S108), then in step S111, the CPU 13 fixes the exposure control value to the exposure control value stored in the memory (not-illustrated) without calculating an exposure control value based on the object luminance information acquired in step S101.

Then, in step S112, the CPU 13 performs exposure control based on the exposure control value stored in the memory (not-illustrated).

Consequently, the exposure control value does not change from the state when the AE lock button 15 has been pressed even if the framing changes after the AE lock button 15 is pressed.

Thus, since there is no change to the state of the light 16 or the exposure control value from the state when the AE lock button 15 has been pressed, when imaging is performed in the AE locked state, light control of the illumination apparatus can be performed that reflects the photographer's intentions.

Figure 4A:
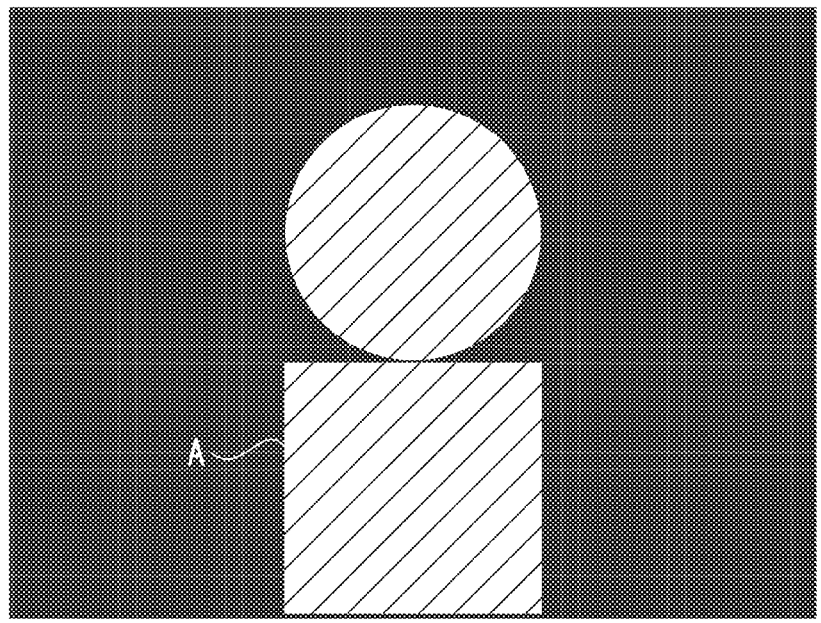
FIGS. 4A and 4B illustrate captured images obtained when light control according to an exemplary embodiment of the present invention is performed.
Figure 4B:
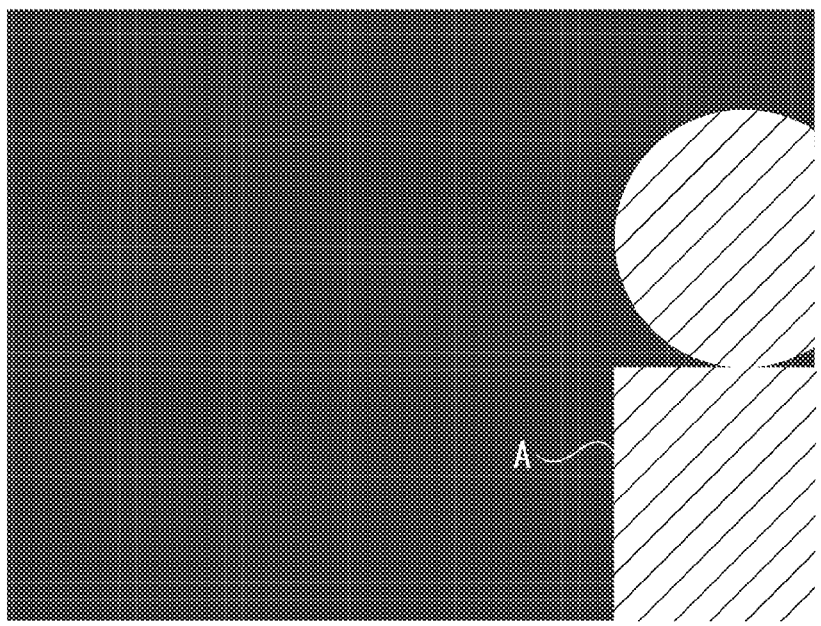

FIGS. 4A and 4B illustrate captured images obtained when the above-described exposure control processing is performed.

Object A illustrated in FIG. 4A is obtained when the AE lock button 15 is pressed with the object A in the center of the image plane. In this case, it is determined that the photographic light does not need to be turned on, since the weighting given to the luminance value of the relatively bright object A is increased. Further, an exposure control value is calculated so that the exposure of the object in the center of the image plane is appropriate. In the above exposure control processing, the state of the photographic light and the exposure control value at this point are stored, and are fixed while the AE is locked. Subsequently, framing is changed as illustrated in FIG. 4B so that the object A is positioned on the side of the image plane. In this case, a background that is quite darker than the object A is in the center of the image plane, so that an increased weighting is given to the luminance value of the dark background. However, while the AE is locked, the state of the light 16 remains fixed in the state obtained before the AE is locked.

Consequently, the exposure of the object A is maintained at the exposure aimed for in FIG. 4A even if the framing is changed from the state illustrated in FIG. 4A to that illustrated in FIG. 4B. Thus, in the present exemplary embodiment, in the AE locked state, the exposure control value and the state of the photographic light determined based on the object luminance information when an AE lock instruction is made are maintained. Consequently, light control of the illumination apparatus can be performed that reflects the photographer's intentions even if the framing is changed in the AE locked state.

Next, with reference to FIG. 5, a case in which the control mode of the photographic light, which has three control modes, is changed while the AE is locked will be described. In the below description, the initial state of the light 16 when the control mode of the photographic light is changed to the automatic control mode is "off". This is because if the light 16 is turned on when the object luminance value is measured by the camera to perform light control of the light 16 under the automatic control mode, it may be impossible to correctly measure the object luminance value due to the occurrence of overexposed regions caused by the light 16 being on.

Figure 5:
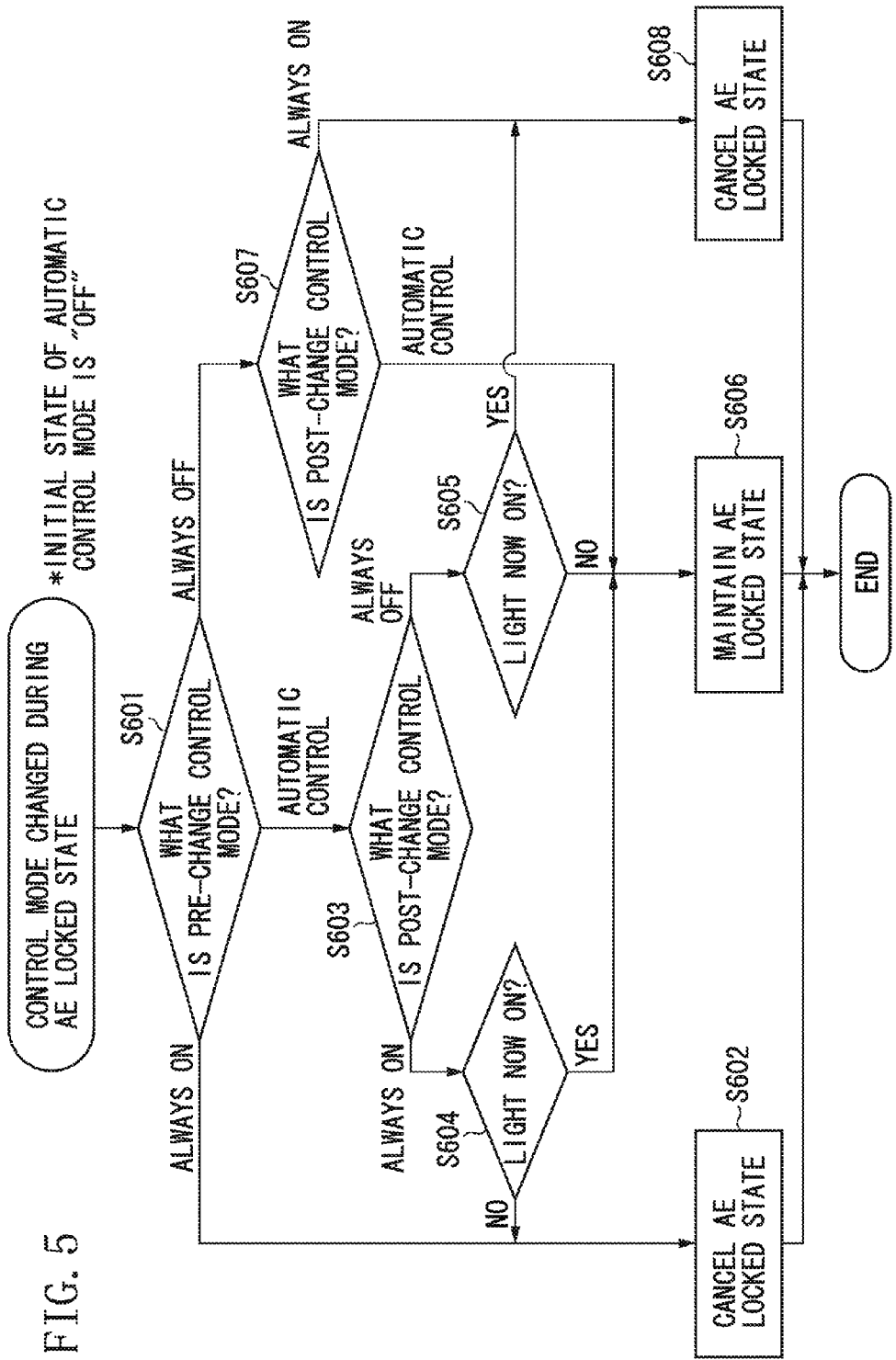
FIG. 5 is a flowchart illustrating light control processing of a photographic light according to the first exemplary embodiment of the present invention.
Figure 7A:
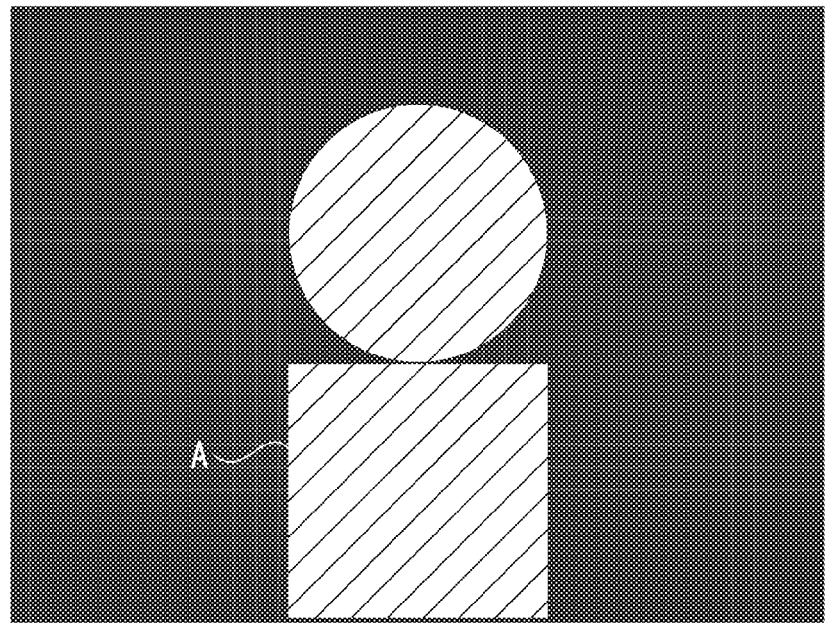
FIGS. 7A and 7B illustrate captured images obtained when conventional light control is performed.
Figure 7B:
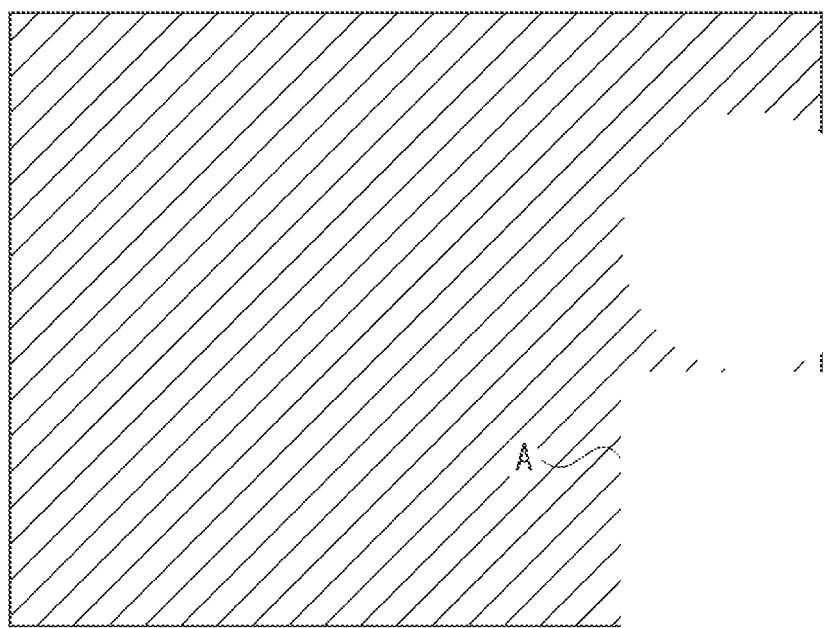

FIG. 5 is a flowchart illustrating light control processing of the photographic light. If the AE lock button 15 is pressed so that the AE is locked, and then the control mode of the photographic light is changed by the control mode change switch 20, in step S601, the CPU 13 determines the pre-change control mode. If the control mode of the photographic light has been changed by the control mode change switch 20, the photographic light transmits to the camera information about the newly set control mode. Further, based on the information transmitted from the photographic light, the CPU 13 determines in a below-described manner whether the state of the light 16 is to be changed. Specifically, the information about the newly set control mode that is transmitted from the photographic light is included in information indicating that the state of the light 16 is to be changed.

If the pre-change control mode is the "always-on mode" (second control mode) (ALWAYS ON in step S601), the processing proceeds to step S602. If the pre-change control mode is the "automatic control mode" (first control mode) (AUTOMATIC CONTROL in step S601), the processing proceeds to step S603. If the pre-change control mode is the "always-off mode" (third control mode) (ALWAYS OFF in step S601), the processing proceeds to step S607. If the pre-change control mode is the always-on mode, the post-change control mode is either the automatic control mode or the always-off mode. Therefore, the light 16, which has been on in the always-on mode, is turned off as a result of the change in the control mode. This causes the object luminance to change due to the light 16, which has been on when the AE is locked, being turned off. Consequently, even if the exposure control value determined when the AE is locked is maintained, the exposure is less than when the AE is locked. Thus, if the control mode is changed from the always-on mode to another control mode when the AE is locked, then in step S602, the CPU 13 cancels the AE locked state.

If the pre-change control mode is the automatic control mode (AUTOMATIC CONTROL in step S601), then in step S603, the CPU 13 determines which mode the control mode has been changed to. If the post-change control mode is the always on mode (ALWAYS ON in step S603), the processing proceeds to step S604, and if the post-change control mode is the always off mode (ALWAYS OFF in step S603), the processing proceeds to step S605. In step S604, the CPU 13 determines whether the light 16 is on. If the light 16 is not on (NO in steps S604), this means that the light 16 will be turned on due to the change to the always on mode. Therefore, the exposure will be greater than when the AE is locked, even if the exposure control value determined when the AE is locked is maintained. Thus, if the control mode is changed from the automatic control mode to the always-on mode when the AE is locked (ALWAYS ON in step S603), and the light 16 is already off before the mode change (NO in step S604), then in step S602, the CPU 13 cancels the AE locked state.

On the other hand, if it is determined in step S604 that the light is on (YES in step S604), there is no change in the state of the light 16 due to the change to the always on mode. Thus, if the control mode is changed from the automatic control mode to the always-on mode when the AE is locked (ALWAYS ON in step S603), and the light 16 is already on before the mode change (YES in step S604), then in step S606, the CPU 13 maintains the AE locked state.

If it is determined in step S603 that the post-change control mode is the always off mode (ALWAYS OFF in step S603), then in step S605, the CPU 13 determines whether the light 16 is turned on. If the light 16 is not on (NO in step S605), the state of the light 16 does not change due to the change to the always off mode. Thus, if the control mode is changed from the automatic control mode to the always-off mode when the AE is locked (ALWAYS OFF in step S603), and the light 16 is already off before the mode change (NO in step S604), then in step S606, the CPU 13 maintains the AE locked state.

On the other hand, if it is determined in step S605 that the light 16 is on (YES in step S605), this means that the light 16 will be turned off due to the change to the always off mode. Therefore, the exposure will be less than when the AE is locked, even if the exposure control value determined when the AE is locked is maintained. Thus, if the control mode is changed from the automatic control mode to the always-off mode when the AE is in a locked state (ALWAYS OFF in step S603), and the light 16 is already on before the mode change (YES in step S605), then in step S608, the CPU 13 cancels the AE locked state.

If the pre-change control mode is the always off mode (ALWAYS OFF in step S601), then in step S607, the CPU 13 determines which mode the control mode has been changed to. If the post-change control mode is the automatic control mode (AUTOMATIC CONTROL in step S607), there is no change in the state of the light 16 due to the change to automatic control mode. Thus, if the control mode is changed from the always-off mode to the automatic control mode when the AE is in a locked state (AUTOMATIC CONTROL in step S607), then in step S606, the CPU 13 maintains the AE locked state.

On the other hand, if it is determined that the post-change control mode is the always-on mode (ALWAYS ON in step S607), this means that the light 16 will be turned on due to the change to the always on mode. Therefore, the exposure will be greater than when the AE is locked, even if the exposure control value determined when the AE is locked is maintained. Thus, if the control mode is changed from the always-on mode to the always-on mode when the AE is in a locked state (ALWAYS ON in step S607), then in step S608, the CPU 13 cancels the AE locked state.

Thus, if the control mode of the photographic light is changed while the AE is locked, if it is necessary to change the state of the light 16 due to the mode change, the AE locked state is canceled. On the other hand, if it is not necessary to change the state of the light 16, the AE locked state is maintained. More specifically, if the state of the photographic light is manually changed when the AE is in a locked state, the AE locked state is canceled. Thus, light control of the illumination apparatus can be performed that reflects the photographer's intentions even if the control mode of the photographic light is changed while the AE is locked.

In the present exemplary embodiment, a case has been described in which the initial state of the light 16 when the control mode of the photographic light is changed to the automatic control mode is "off". However, the initial state may be "on". In this case, similarly to the above light control processing, the light control processing can be performed so that when it is necessary to change the state of the light 16 due to a mode change, the AE locked state is canceled, and when it is not necessary to change the state of the light 16, the AE locked state is maintained.

A second exemplary embodiment of the present invention will now be described with reference to FIG. 6. Since the configurations of the camera and the photographic light in the present exemplary embodiment are similar to those in the first exemplary embodiment, a detailed description thereof will not be repeated here.

In the present exemplary embodiment, the camera can record moving images. FIG. 6 is a flowchart illustrating the processing performed when the AE lock button 15 is pressed while the AE is locked. In FIG. 6, the control mode of the photographic light is set to the automatic control mode.

When the AE lock button 15 is pressed so that the AE is in a locked state, in step S701, the CPU 13 determines whether the AE lock button 15 has been pressed again. If the AE lock button 15 has been pressed (YES in step S701), the processing proceeds to step S702, and if the AE lock button 15 has not been pressed (NO in step S701), step S701 is repeated until the AE lock button 15 is pressed.

If the AE lock button 15 is pressed again while the AE is locked, then in step S702, the calculation circuit 8 acquires the object luminance information based on the image data output from the imaging circuit 7. Then, in step S703, the CPU 13 determines whether the camera is now recording moving images. If the camera is not recording moving images (NO in step S703), the processing proceeds to step S704. If the camera is recording moving images (YES in step S703), the processing proceeds to step S708.

If the camera is not recording moving images, the camera determines that the photographer wants to update the fixed exposure control value and the state of the photographic light. Therefore, the appropriate state of the photographic light is again determined.

In step S704, the CPU 13 determines whether to turn on the light 16 based on the object luminance information acquired in step S702. This determination is performed based on whether the object luminance value based on the object luminance information acquired in step S702 and then weighted using a predetermined weighting is less than a predetermined threshold. If the calculated weighted object luminance value is less than the predetermined threshold (YES in step S704), the CPU 13 determines that the light 16 is to be turned on. If the calculated weighted object luminance value is equal to or greater than the predetermined threshold (NO in step S704), the CPU 13 determines that the light 16 is to be turned off.

If it is determined to turn on the light 16 (YES in step S704), the processing proceeds to step S705. In step S705, the CPU 13 issues an instruction to the light CPU 21 via the communication terminal 12 to turn on the light 16. Based on the instruction from the CPU 13, the light CPU 21 turns on the light 16. If the light 16 is already on, step S705 may be skipped. Further, in the present exemplary embodiment, although the light emission intensity of the light 16 when it is turned on is fixed, the light emission intensity of the light 16 may be varied based on the object luminance information. In this case, in step S705, the CPU 13 also outputs to the photographic light information about the light emission intensity of the light 16 that is calculated based on the object luminance information. Then, if the light 16 is already turned on, the light CPU 21 varies the light emission intensity of the light 16 based on the information about the light emission intensity output from the CPU 13.

On the other hand, if it is determined to turn off the light 16 (NO in step S704), the processing proceeds to step S706. In step S706, the CPU 13 issues an instruction to the light CPU 21 via the communication terminal 12 to turn off the light 16. Based on the instruction from the CPU 13, the light CPU 21 turns off the light 16. If the light 16 is already off, step S706 may be skipped.

In step S707, the CPU 13 stores information about the state (turned-on state or turned-off state) of the light 16 transmitted from the photographic light in a (not-illustrated) memory.

If it is determined in step S703 that the camera is now recording moving images (YES in step S703), if the state of the light 16 were changed while recording the moving images, the object luminance would drastically change, which would result in unnatural moving images being recorded. Therefore, the CPU 13 maintains the state of the light as it is before the AE lock button 15 is pressed again.

Then, in step S709, the CPU 13 calculates the exposure control value based on the object luminance information acquired in step S702. In this step, because the fact that the AE lock button 15 is pressed indicates that the photographer wants to update the fixed exposure control value, even if the camera is recording moving images, an exposure control value is calculated.

Then, in step S710, the CPU 13 stores the exposure control value calculated in step S709 in the (not-illustrated) memory. In step S711, the CPU 13 performs exposure control based on the exposure control value stored in the (not-illustrated) memory.

Thus, if the AE lock button 15 is pressed while the camera is recording moving images in the AE locked state, the fixed exposure control value is updated without changing the state of the light 16. Consequently, control can be performed that reflects the photographer's operation intentions while preventing sudden changes in the object luminance during recording.

In the present exemplary embodiment, although the exposure control value and the state of the photographic light are updated due to the AE lock button 15 being pressed while the AE is locked, the exposure control value and the state of the photographic light may be updated by an operation on an operation unit other than by the AE lock button 15.

Further, in the present exemplary embodiment, although the light control of the photographic light is performed based on whether the camera is recording moving images or not, this determination is not limited to whether the camera is recording moving images. For example, the light control of the photographic light may be performed based on whether the camera is set to a mode that allows moving images to be recorded.

In the above two exemplary embodiments, the processing performed by the CPU 13 may be performed by the light CPU 21, and the processing performed by the light CPU 21 may be performed by the CPU 13. For example, when the control mode of the photographic light is changed by the control mode change switch 20, the light CPU 21 may determine whether the state of the light 16 is to be changed based on the change in control mode, and the photographic light may transmit information about the determination result to the camera. Alternatively, the light CPU 21 may determine whether the state of the light 16 is to be changed, and if the state of the light 16 is to be changed, the photographic light may transmit information indicating that the state of the light 16 is to be changed to the camera. Alternatively, the light CPU 21 may determine whether the state of the light 16 is to be changed, and if the state of the light 16 is to be changed, the light CPU 21 may instruct the CPU 13 to cancel the exposure fixed state.

Further, in above two exemplary embodiments, although the CPU and the calculation circuit are described separately, the CPU may include the calculation circuit.

In addition, the photographic light as described in the above two exemplary embodiments does not have to be attached to the camera. The camera system may be configured so that the photographic light is included in the camera.

Still further, the processing described in the above two exemplary embodiments can also be executed along with processing performed in other exemplary embodiments.

Moreover, in the above two exemplary embodiments, the AE locked state may be canceled if a predetermined duration elapses after the AE lock button 15 is pressed, or may be canceled by an operation on the operation unit 11. However, similar to the concept described in the above two exemplary embodiments, it is desirable that the state of the photographic light is not changed during recording of moving images even if a condition for canceling the AE locked state is satisfied.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-219487 filed Sep. 29, 2010, which is hereby incorporated by reference herein in its entirety.

What is claimed is:

1. An imaging apparatus capable of imaging using an illumination apparatus, the imaging apparatus comprising:
 an acquisition unit configured to acquire object luminance information;
 a calculation unit configured to calculate an exposure control value based on the object luminance information acquired by the acquisition unit;
 an exposure control unit configured to control exposure using the exposure control value calculated by the calculation unit; and
 an exposure fixing unit configured to set an exposure fixed state in which the exposure control value calculated by the calculation unit is fixed as the exposure control value to be used for exposure control,
 wherein the exposure fixing unit is configured to cancel the exposure fixed state when a state of the illumination apparatus is changed in the exposure fixed state.

2. The imaging apparatus according to claim 1, wherein the exposure fixing unit is configured to cancel the exposure fixed state when the state of the illumination apparatus is changed by an operation made by a user in the exposure fixed state.

3. The imaging apparatus according to claim 1, wherein the exposure fixing unit is configured to cancel the exposure fixed state when the state of the illumination apparatus is changed by an operation to change a light mode of the illumination apparatus made by a user in the exposure fixed state.

4. The imaging apparatus according to claim 1, further comprising a light control unit configured to change the state of the illumination apparatus based on the object luminance information, wherein the light control unit does not change the state of the illumination apparatus based on the object luminance information when in the exposure fixed state.

5. The imaging apparatus according to claim 1, further comprising an operation unit configured to receive an operation for resetting the exposure control value that is fixed in the exposure fixed state, wherein the imaging apparatus is capable of recording a moving image, wherein the exposure fixing unit is configured to, when the operation is performed on the operation unit during recording of a moving image, reset the exposure control value fixed in the exposure fixed state to an exposure control value calculated based on object luminance information newly acquired by the acquisition unit, and wherein the light control unit does not change the state of the illumination apparatus based on the object luminance information newly acquired by the acquisition unit.

6. A camera system including an illumination apparatus and an imaging apparatus, the camera system comprising:

an acquisition unit configured to acquire object luminance information;

a calculation unit configured to calculate an exposure control value based on the object luminance information acquired by the acquisition unit;

an exposure control unit configured to control exposure using the exposure control value calculated by the calculation unit; and an exposure fixing unit configured to set an exposure fixed state in which the exposure control value calculated by the calculation unit is fixed as the exposure control value to be used for exposure control, wherein the exposure fixing unit is configured to cancel the exposure fixed state when a state of the illumination apparatus is changed in the exposure fixed state.

7. An illumination apparatus that is connectable to an imaging apparatus capable of fixing an exposure control value used for exposure control, the illumination apparatus comprising:

an operation unit configured to receive an operation for changing a light control mode, wherein, when the state of the illumination apparatus is changed based on the operation on the operation unit, if the imaging apparatus is in an exposure fixed state in which an exposure control value is fixed, the illumination apparatus is configured to transmit to the imaging apparatus information indicating that the state is to be changed to cancel the exposure fixed state.

* * * * *